Dec. 23, 1930.  C. A. WYMAN  1,786,142
BAKING OVEN
Filed May 10, 1927   2 Sheets-Sheet 2

INVENTOR
Charles A. Wyman
BY
ATTORNEY

Patented Dec. 23, 1930

1,786,142

UNITED STATES PATENT OFFICE

CHARLES A. WYMAN, OF AUBURN, WASHINGTON

BAKING OVEN

Application filed May 10, 1927. Serial No. 190,197.

This invention relates to ovens for use in bakeries, hotels and other places where large quantities of bread or other kinds of food are to be cooked.

The object of the invention is the provision of an oven of this character whereby bread and other comestibles may be cooked more uniformly, expeditiously and conveniently than hitherto.

Another object of the invention is to provide for these purposes a simple, compact oven structure which is inexpensive to operate both as to fuel and labor.

Another object is to provide an oven which is readily kept clean and in good working condition.

To these and other ends which will appear in the following specification, the invention consists in the novel construction, adaptation and combination of parts hereinafter described and claimed.

In the accompanying drawings,—

Figure 1:
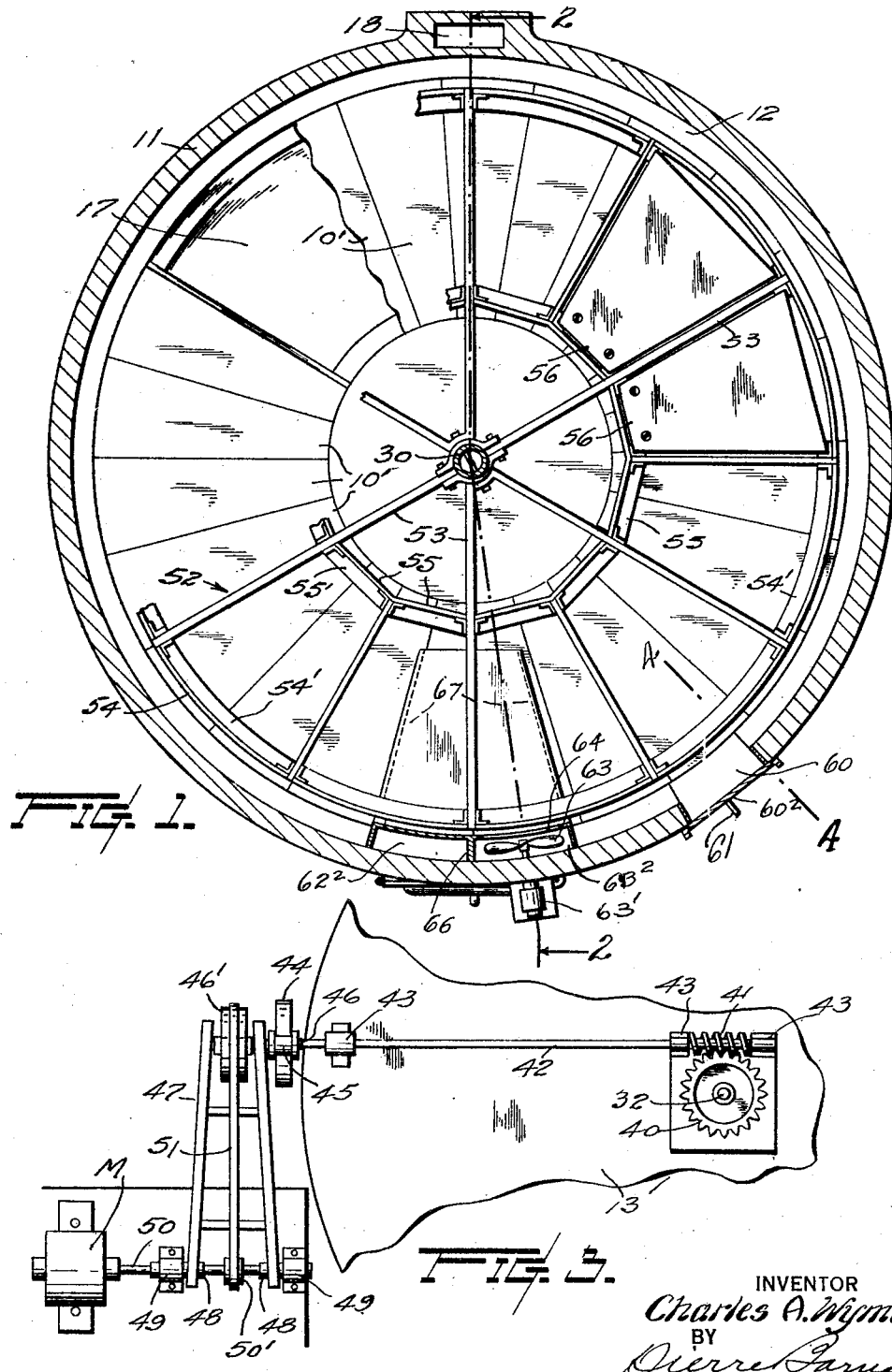
Figure 2:
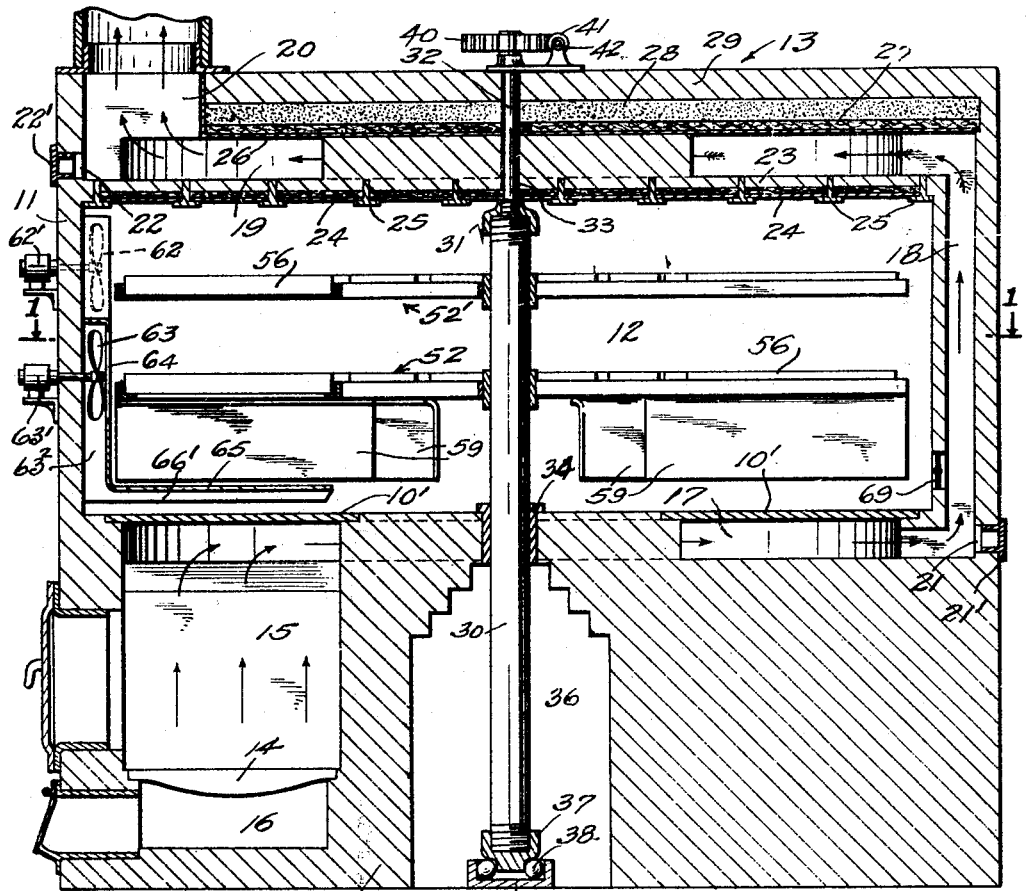
Figure 4:
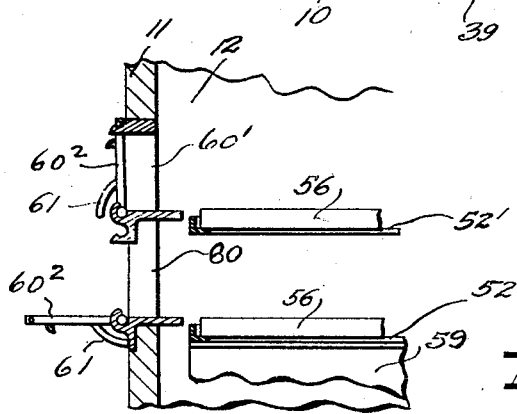
Figure 5:
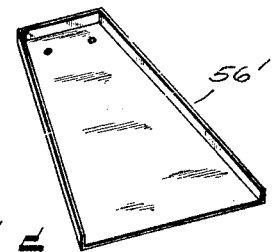
Figure 6:
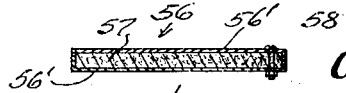

Figure 1 is a horizontal sectional view through 1—1 of Fig. 2 of an oven embodying the present invention, parts being broken away. Fig. 2 is a vertical section taken substantially on line 2—2 of Fig. 1. Fig. 3 is a fragmentary top plan view of the oven structure, to illustrate the now preferred manner of driving the rotary cage, which is shown in the preceding views. Fig. 4 is a detail vertical section on line 4—4 of Fig. 1. Fig. 5 is a perspective view of one of the parts of a floor box-element of a rotary shelf. Fig. 6 is a longitudinal vertical section of a floor box-member.

In said drawings, the reference numeral 10 represents the base portion of the oven structure which is desirably circular in horizontal section and supports the circular peripheral wall 11 of the oven chamber 12 and its roof 13.

Said oven structure is of brick, concrete or other material able to withstand the heat employed in the device, and which is a relatively poor heat conductor.

Provided in the oven base is a chamber which is divided by a grate 14 to provide a furnace chamber 15 and an ash pit 16 above and below the grate, respectively. In the upper portion of the oven base 10 and separated by means of metal plates $10^1$ from the oven chamber 12 is an annular channel 17 connecting the furnace chamber by two semi-circular flues with the lower end of an upwardly extending flue 18 at diametrically opposite sides of the oven from the furnace.

The upper end of the riser flue 18 is connected by means of two semi-circular flues such as 19, with a chimney inlet 20 above the furnace. 21 and 22 are cleanout openings for the horizontal flues 17 and 19, respectively, the same being provided with removable closures $21^1$ and $22^1$. The ceiling of the oven chamber 12 constitutes the floors of the flues 19, said ceiling being made of relatively thin brickwork 23 over metal plates 24 supported by girder elements 25. The covering of the relatively quick heat-conducting plates 24 by the thin brickwork prevents a rapid cooling of the oven chamber from above in the event of any abatement or extinguishing of the fire, yet permits heat passing down by conduction into the oven chamber from hot smoke or burning combustible gases passing through the flues 19 to the chimney. The ceiling of the flues 19 are advantageously protected by a poor heat conducting material or materials which are supported upon iron plates 26; as, for example, layers 27 and 28, respectively, of sheet asbestos and sand, and above which is brick work 29.

Extending axially through said structure is a vertical shaft consisting, preferably, of a length of pipe 30 rigidly connected by a coupling 31 with a shaft element 32.

The shaft part 32 extends through a tubular bearing 33 in the structure above the oven chamber; the pipe part of the shaft extending through a tubular bearing 34 in the structure into a compartment 36 below the oven chamber.

The lower end of the shaft is provided with a circular foot piece 37 which is desirably mounted upon bearing balls 38 provided in the cavity of a supporting plate 39.

Above the oven structure, said shaft has mounted thereon a worm wheel 40 which is driven by a worm 41 upon a counter shaft 42 (Fig. 3) which is journaled in suitable bearing boxes as 43.

As shown, the shaft 42 has mounted thereon a friction wheel 44 which is driven by means of a friction pinion 45 upon another shaft 46 which is journaled in the free end of a frame 47. This frame is pivotally connected at its other end to bosses 48 of bearing boxes 49 of a power driven shaft 50.

51 represents an endless transmission belt passing about pulleys $50^1$ and $46^1$ upon the respective shafts 50 and 46 to effect the rotation of the pinion 45 which contacts peripherally with the friction wheel 44. As illustrated the frame 47 is arranged to have its free end supported by the wheel 44 to ensure sufficient weight for friction between said wheel and pinion for driving the rotary parts in the oven chamber.

The shaft 50 may be driven by any suitable power means, such for instance, as an electric motor which is denoted by M.

Rigidly secured to the part 30 of the vertical shaft within the oven chamber is a cage consisting of vertically spaced apart skeleton frames, two being shown in Fig. 2, which are denoted by 52 and $52^1$, respectively.

Each of these frames is composed of a plurality of radially disposed bars 53 connected to circumferentially arranged bar elements 54 and 55 having horizontal flange elements $54^1$ and $55^1$. The bar flanges $54^1$ and $55^1$ furnish seats for supporting the ends of boxes 56 containing asbestos 57 (Fig. 6) or other heat retarding material. The boxes are preferably formed of two complementary parts $56^1$ (one being shown in Fig. 5) which are coupled together as by means of bolts 58.

Depending from the lower frame 52 is a plurality of vanes 59 which function to effect a circulatory movement of the heated air beneath said frame. The floor boxes 56 are employed in the various spaces provided therefor by the respective bars 53, 54 and 55 of said skeleton frames 52 and $52^1$, thereby providing substantially continuous annular platforms or shelves disposed in horizontal planes one above the other. The food which is to be cooked in the oven is placed in pans, or otherwise, upon either of said platforms and is revolved with the latter in an orbital path about the interior of the oven chamber until the cooking is completed.

The food in its raw state is inserted into the oven chamber through openings 60 and $60^1$ for the respective platforms.

The doors $60^2$ for the oven openings are represented in Fig. 4, one being closed, the other open and supported bracket-like by means of an arm 61 engageable with the oven wall.

The rotation of the circular platforms with the articles to be cooked and the vanes 59 depending from the frame of the lower platform, serves to circulate the heated air within the oven chamber for cooking purposes.

In the baking of some kinds of comestibles, a more rapid movement of the heated air is desirable as, for example, in crusting certain kinds of bread loaves. To which end, I provide means to create hot air currents which will traverse the rotating shelves diametrically of the oven.

Such means comprises one or more rotary fans, two being shown, which are indicated by 62 and 63, the same being located to rotate about horizontal axes disposed slightly above the planes of the respective shelves. The fans may be driven by means of individual electric motors $62^1$ and $63^1$ through the medium of their armature shafts which extend through the oven wall 11 from the motors at the outside to the fans within the oven. These fans are, moreover, located in ducts $62^2$ and $63^2$ each having a discharge opening—as 64—in front of the respective duct, and receiving hot air from the space between the plate $10^1$ which is directly above the furnace chamber 15 and a baffle plate 65.

The partition 66 between the ducts $62^2$ and $63^2$ extends as a flange $66^1$, below the baffle plate. Other flanges similar to $66^1$ and indicated by dotted lines 67 in Fig. 1, are provided along the side edges of the baffle to provide channels extending radially of the oven center, between the baffle 65 and the hot plates $10^1$ which are above the furnace to the ducts of the respective fans.

A damper valve, represented by 69 in Fig. 2, is provided in the peripheral wall of the oven chamber for controlling the effective size of an opening making communication between the oven chamber 12 and the uptake smoke flue 18, for the purpose of withdrawing heated air and cooking fumes from the oven chamber into the referred to flue. The regulating of the damper valve 69 may be attained by means of a rod inserted through the clean-out opening 21.

In operation, the smoke and hot combustion gases produced in the furnace pass upwardly from the latter into the flues 17 whence they pass upwardly through the flue 18 to escape through flues 19 into the chimney connection 20. In thus passing through the flues 17, and 19, the greater portion of the heat contained in the combustion gases, etc., is conducted through the plates $10^1$ and 24 into the oven chamber 12.

The relatively great heat radiated from those of the plates $10^1$ which are directly above the furnace is intercepted by the baffle 65 and is drawn from the space below the baffle through ducts $62^2$ and $63^2$ by means of fans 62 and 63 to be delivered in streams of air driven substantially diametrically across the oven chamber to subject the bread or other articles of food which are carried upon the shelves to a top heat as such articles successively pass through such hot air streams.

The use of the vanes 59 in imparting a circulatory movement to the air above all of the plates 10¹ is an important feature of the invention by reason of their functioning to equalize the heat, and enable the baking to be effectually performed in all parts of the oven chamber.

In the event that it is desirable that the temperature of the interior of the oven chamber should, for any reason, be lowered, the damper 69 is moved into its open position, whereupon the draft obtaining in the flue 18 serves to suck the air from the oven chamber. When the damper 69 is thus utilized the vanes 59, one or the other of the doors 60² should be opened more or less for the admission of relatively cool air from the outside to replace the hot air withdrawn from the inside of the oven chamber.

From the foregoing description it is believed that the construction and operation of the illustrated embodiment of the invention will be understood.

While I have described with much detail an embodiment of the invention now preferred by me, I do not wish to confine myself specifically thereto except as limited by the scope of the appended claims.

What I claim, is:—

1. In a baking oven of the character described, having a baking chamber, a furnace located below the chamber, a metal wall located above the furnace and serving to partition the latter from said chamber, a rotary shelf provided in the chamber and adapted to revolve about said wall, a horizontal baffle located between said wall and the rotary shelf, a fan located at one side of the chamber, a conduit extending from the space between said wall and the baffle to the fan, and means to drive the fan to effect the withdrawal of hot air from said space and its delivery diametrically of the chamber and above the shelf.

2. In a baking oven, the combination with the casing having a circular chamber, heat conducting flues in the floor and ceiling walls of said chamber, a vertical shaft extending axially through said chamber, annular horizontal shelves carried by said shaft, a furnace provided in the casing wall beneath said chamber at one side of the latter, said furnace having communicative connection with said flues, and vanes provided in said chamber and revolubly carried by the shaft to pass successively through the relatively hot portion therein above the furnace and effect a horizontal circulatory movement of the heated air for distributing the heat uniformly in the chamber.

3. In a baking oven of the character described, the combination of the casing containing a circular oven chamber, a cage provided in said chamber and rotatable about the vertical axis thereof, power driven means for rotating the cage, shelf devices removably mounted upon said cage, said devices being arranged to provide a plurality of annular platforms disposed in vertically spaced apart relation, said casing being provided in its peripheral wall with openings giving access to the respective platforms, doors for said openings, and blades disposed in vertical planes and carried by the cage and rendered operative by the rotary travel thereof for effecting a circulatory movement of the air in the lower portion of the oven chamber.

4. In a baking over, the combination of an inclosing structure including a furnace, a vertically journaled shaft provided in said structure, a series of superposed shelves carried by the shaft, a horizontally disposed fan member comprising vertically arranged blades secured to the shaft, and a power operated means for rotating the shaft to revolve said blades to effect the horizontal circulation of heated air in the oven.

5. In a baking oven, an inclosed baking chamber, a flue exteriorly disposed with respect to said chamber beneath the floor thereof, said flue being arranged to conduct heated air from a furnace, and a power driven fan within said chamber, said fan being arranged to force heated air transversely of said chamber on a horizontal plane substantially midway of the height thereof, said fan being cooperative with means including a horizontally disposed baffle for trapping the air adjacent said flue-heated floor for conducting the same to the fan.

Signed at Seattle, Washington, this 14th day of April, 1927.

CHARLES A. WYMAN.